Aug. 8, 1967  A. R. MORRIS  3,335,086
SOIL ANTI-REDEPOSITION AGENT
Filed June 30, 1964  2 Sheets-Sheet 1

INVENTOR.
ADOLPH ROY MORRIS

United States Patent Office 3,335,086
Patented Aug. 8, 1967

3,335,086
SOIL ANTI-REDEPOSITION AGENT
Adolph Roy Morris, South Norwalk, Conn., assignor to American Cyanamid Company, Stamford, Conn., a corporation of Maine
Filed June 30, 1964, Ser. No. 379,107
14 Claims. (Cl. 252—89)

ABSTRACT OF THE DISCLOSURE

A soil anti-redeposition composition consisting essentially of carboxymethyl cellulose and a hydrolized polymer having a substantially linear hydrocarbon chain which contains relative mole ratios of (1) from about 30 to 99 of hydroxyl to (2) from about 1 to 70 of carboxylic acid.

---

Figure 1:
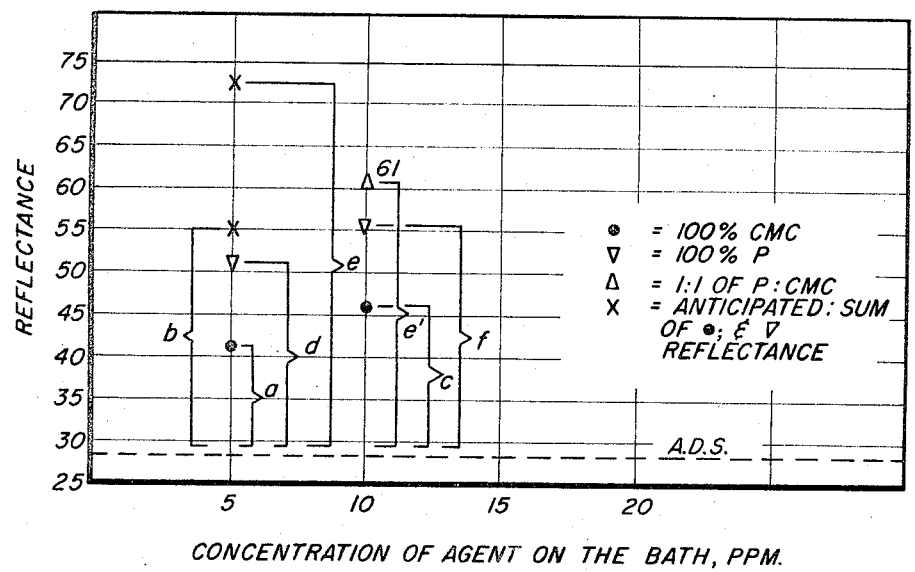

This invention relates to a composition useful as a soil redeposition inhibitor. More particularly, it relates to a composition useful for preventing the redeposition of soil onto fabrics, clothes, and the like, during cleaning operations such as washing, shampooing, laundering, and dry cleaning. Still further, this invention relates to the use of such composition comprising a polymer of substantially linear hydrocarbon chain having hydroxyl and carboxylic acid substituents in a molar ratio within critical limits in combination with a cellulose derivative. Although the hydrocarbon chain is believed to be predominantly linear, the exact degree of branching is as yet undetermined.

The phenomenon of soil redeposition is generally understood to refer to the deposition of soil onto fabric, clothes, and the like, from the suspension of soil in a washing, shampooing, laundering, or dry cleaning solution. While such solutions are generally capable of exerting a "soil suspending action," certain factors influence and control the redeposition of solid soil onto fabrics, clothes, and the like, and such factors are generally considered to be similar to those which influence removal of the soil. Thus, the chemical composition of the fabrics, clothes, and the like, and the composition of the washing, shampooing, laundering, and dry cleaning solution are thought to be important. Further, whether soaps or synthetic detergents are utilized influences soil suspension or redeposition prevention. Similarly, the temperature, time, amount of detergent present affect redeposition just as they affect detergency.

A cellulose derivative, sodium carboxymethyl cellulose, hereinafter abbreviated as CMC, has achieved prominence as a soil redeposition inhibitor. CMC's action as a soil redeposition has been attributed to its protective colloid function and it has long been used in commercial laundering compositions. Although certain proteins, vinyl pyrrolidine polymers, polyvinyl alcohols, and starch derivatives have been suggested as replacements for CMC in commercial laundering compositions, CMC appears to possess certain properties which make it especially desirable in hard water and when metallic cations are present in a system.

In spite of its wide use and acceptance as a soil redeposition inhibitor, CMC is inferior to a particular class of polymers which have been recently developed for soil redeposition inhibition as measured by reflectance values for test fabrics, in accordance with a standardized test.

It is generally known that the hand of the washed fabrics tends to be affected adversely by the use of anti-redeposition agents, and that it is therefore desirable to use minimal amounts to obtain optimum anti-redeposition and reflectance. Therefore, optimum anti-redeposition at minimal concentration is preferable.

Also, currently available anti-redeposition agents are not effective, to a commercially acceptable degree, on all fabrics, such as rayon.

An object of this invention is to obtain a new and useful composition having anti-redeposition properties.

Another object is to reduce redeposition of soil.

Another object is to obtain synergistic effects in reducing soil redeposition, by using particular anti-redeposition agents in combination as a new composition.

Another object is to achieve optimum anti-redeposition of soil, at a minimum economic cost.

Another object is a new and useful composition having a minimal adverse effect on hand of the fabric.

Another object is a new and useful composition which is effective during cleaning operations on an increased variety of different types of fabrics.

Other objects become apparent to the ordinary artisan in the light of the preceding and following disclosure.

In accordance with the present invention, it has been discovered that the objects of this invention are achieved by employing a combination of (1) a particular hydrolyzed copolymer in combination with (2) CMC (carboxymethyl cellulose), whereby a surprisingly effective soil redeposition inhibitor is obtained.

Figure 2:
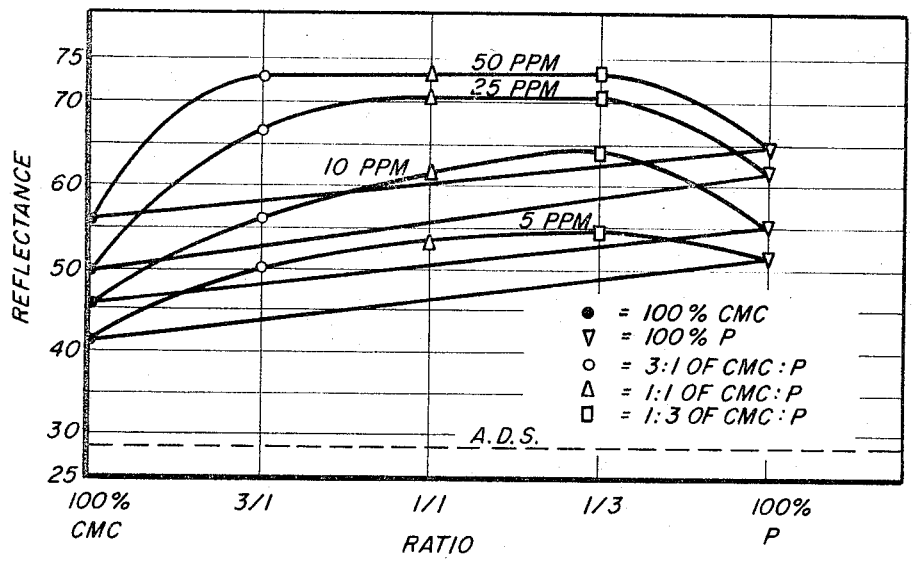
Figure 2:
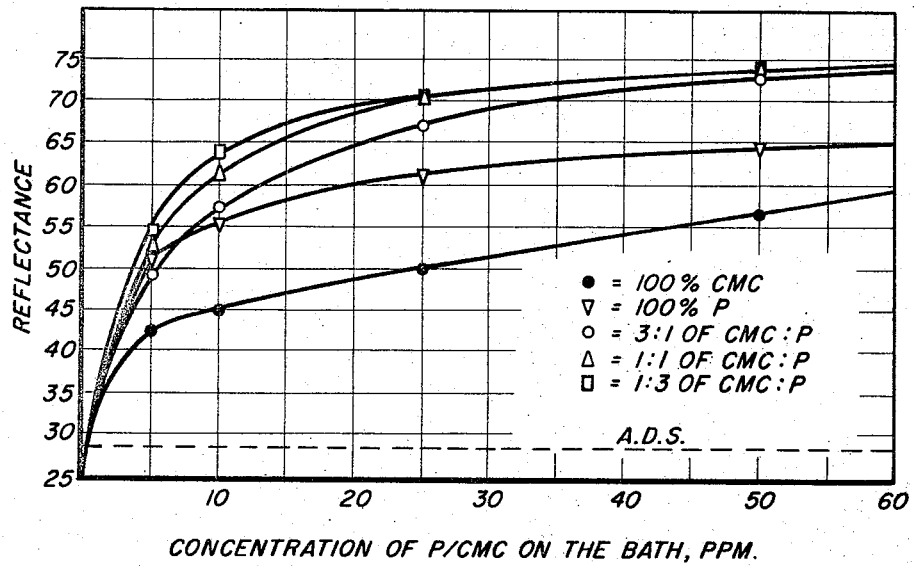

The graphs of FIGURES 1, 2, and 3 illustrate the unexpected results obtained.

FIGURE 1 chart illustrates the degree to which summation of results may be expected when concentrations are added, and compares the actual results (reflectance) of the summation of the separate ingredients in a 1:1 ratio.

FIGURE 2 chart illustrates the actual results as compared with anticipated results, as affected by varying ratios of the two ingredients.

FIGURE 3 illustrates reflectance as a function of concentration, for each separate ingredient and for the two ingredients in varying ratios.

The FIGURES 1, 2, and 3 are discussed more fully in Example I, illustrated in Table I.

The particular class of polymers which are employed in combination with CMC and a detergent to form a detergent composition is hydrolyzed polymer having a substantially linear hydrocarbon polymer chain which contains relative mole ratios of (1) from about 30 to 99 of hydroxyl to (2) from about 1 to 70 of carboxylic acid. The alkaline hydrolyzed polymers are derived from (a) vinyl acetate and (b) a lower alkyl acrylate such as methyl acrylate, ethyl acrylate, propyl acrylate, and equivalents thereof. The vinyl acetate monomer and the acrylate monomer respectively, are preferably present in the polymer in a ratio of between about 60 to 90 vinyl acetate, to between 40 to 10 acrylate, respectively.

The process for making the polymer may be by either of two typical and conventional methods. In one method, monomers are "emulsified" and added to a reaction mixture of water containing a conventional acidic polymerization initiator. By a second method, a monomer "mixture" is added to the above reaction mixture. By both processes, the copolymerization reaction produces a latex, which is subsequently hydrolyzed typically by a strong base (such as sodium hydroxide), at a pH of about 12 to 13. By hydrolyzing in the presence of the strong base, the acetate and acrylate substituents are converted to the alcohol substituents, the carboxylate substituents, the alkaline carboxylic salt substituents, or substituent mixtures thereof. Upon completion of the hydrolysis, the pH is normally adjusted to about 8.5 to 9.5.

Hereafter, this polymer shall be designated as P.

The use of such polymers P as soil redeposition inhibitors is further described and claimed in copending application Ser. No. 253,931, filed Jan. 25, 1963, now Patent No. 3,284,364.

It has been unexpectedly found that by employing a polymer P/CMC ratio of from about 95/5 to about 5/95 unusually effective soil redeposition inhibition is obtained. Contrary to what might be expected, by employing the two known soil redeposition inhibitors in combination, an unexpectedly greater degree of soil redeposition inhibition is obtained than if either were employed alone. By utilizing the particular class of polymer in conjunction with CMC within the stated ratios a synergistic effect is obtained. By synergistic effect is meant that (1) the sum total of soil redeposition inhibitory action exerted by the particular class of polymer in combination with carboxymethyl cellulose is greater than either alone at equivalent concentrations, and (2) the actual reflectance obtained from a certain cencentration of the agents used in combination is greater than the reflectance expected from the combination of the respective agents based on the reflectance of the agents used alone.

The synergism appears to produce optimum reflectance when the CMC and the polymer P are present in combination in the range between the ratio of about 95 CMC to 5P and the ratio of about 10CMC to 90P, in parts by weight, as represented in Example I, FIGURE 2. The preferred ratio of CMC to P is in the range from the ratio of about 85:15, to the ratio of about 25:75.

The amount of soil redeposition inhibitor or anti-redeposition agent used in any cleaning formulation will vary within wide limits and will depend to a great extent on the nature and characteristics of the material being cleaned, or whether the fabric be cotton, rayon, acetate, wool, polyester, acrylic or of other origin or mixtures thereof, the purpose for which the fabrics of material is intended, the degree of cleanliness desired and other variables. For most purposes, it has been found that from about 0.05 to about 10% by weight based on the weight of a complete formulation containing the soap detergent, non-soap detergent or dry cleaning detergent is usually satisfactory and that within our commercial limits amounts of from about 0.4% to about 5% by weight of a total formulation, have been preferable. The preferred range, based on the method of preparation in Example I, would correspond to about 4 p.p.m. (parts per million) in the washing bath containing the normal (see above) concentration of the complete formulation to about 50 p.p.m.

The amount of active detergent substituent of a cleaning formulation will also vary within wide limits and will depend upon such factors as specified above and in particular the purpose for which the formulation is intended. It has been found that from about 5 to about 95% of the total weight may advantageously be the detergent constituent with the preferred narrower commercial limits being from about 20 to about 35% by weight.

The cleaning formulation may also have added to it various other special additives such as hydrotopes or coupling agents, building agents and fillers including soda ash, sodium sesquicarbonate, sodium tetrapyrophosphate, sodium tripolyphosphate, sodium silicate, sodium metasilicate, borax and the like. In addition, non-alkaline inorganic salts such as sodium sulfate, sodium chloride and sodium bicarbonate may be added as well as scouring abrasives such as diatomaceous earth or ground pumice, bentonite and various other clays and clay-like substances. The amount of such special purpose additives or builders will naturally vary within side limits or may even be omitted entirely. However, it has been found that amounts of from about 1% up to as high as 80% by weight based on the formulation weight may be added depending upon the purpose for which the formulation is intended.

The soil redeposition inhibitors of this invention may be incorporated into bar soaps for cleaning, laundering and scrubbing; scouring powders for more abrasive purposes; powdered or flaked soaps and synthetic organic non-soap detergents for laundry and general cleaning; for dry cleaning detergents and agents; and other synthetic detergents in liquid form.

As specific examples of various detergents the following are illustrative: sodium or potassium soaps of the fatty acids both saturated and unsaturated; synthetic organic non-soap detergents including the anionic detergents such as the sulfates of long chain fatty alcohols as sodium lauryl sulfate and sodium stearyl sulfate; the alkylaryl sodium sulfonates such as the alkyl benzene, toluene and naphthalene sodium sulfonates; the fatty monoglyceride sulfates such as sodium glycerol monolaurate sulfate and the dedecyl phenyl polyglycol ethers. In addition, the nonionics such as pentaerythritol long chain monoesters, the alkyl phenolethylene oxide adducts, and the cationics such as lauramidpropyl dimethylbenzyl ammonium chloride, N-diethylamino oleamide hydrochloride and various dry cleaning detergents or agents such as naptha, trichloroethylene, perchloroethylene, carbon tetrachloride, Stoddard solvent and the like.

As noted hereinabove, the soil redeposition inhibiting agents of this invention may be employed with conventional hydrotopes or coupling agents such as xylene or toluene sulfonate, particularly in liquid detergent formulations. Quite surprisingly, it has been observed that the soil redeposition inhibitor compositions of this invention function as hydrotopes and function particularly well in this capacity with non-ionic detergents. Thus, additional amounts of the soil anti-redeposition agents of this invention may be employed in formulations for the purpose of functioning as hydrotopes, and in this regard may be employed to replace all or part of the hydrotope normally employed.

Some typical illustrative formulations contemplated by this invention are as follows:

LIQUID TYPE

| | Percent |
|---|---|
| Sodium alkylaryl sulfonate | 15.5 |
| Sodium methyl coco taurate | 10.4 |
| Tetrapotassium pyrophosphate | 21.4 |
| Sodium sulfate | 2.1 |
| Sodium silicate | 2.5 |
| Soil anti-redeposition agent of this invention | 1.3 |
| Water | 46.7 |

Trace quantities blue and fluorescent dye.

POWDER TYPE

| | Percent |
|---|---|
| Sodium alkylaryl sulfonate | 36.2 |
| Sodium tripolyphosphate | 35.0 |
| Sodium carbonate | 0.9 |
| Sodium sulfate | 12.5 |
| Sodium silicate | 6.5 |
| Sodium chloride | 1.0 |
| Soil anti-redeposition agent of this invention | 0.7 |
| Moisture | 7.2 |

Trace quantities of fluorescent dye.

In order to illustrate further, the present invention, the following example is given primarily by way of illustration. No specific details or enumerations contained therein should be construed as limitations on the present invention except insofar as they appear in the appended claims. All parts and percentages are by weight unless otherwise specifically designated.

*Example 1*

The synergistic effect of blends of CMC with P and polyvinyl alcohol as soil antiredeposition agents were studied at four concentration levels.

Solutions of CMC and P were made at 0.1% concentrations, and blends of these solutions were made at ratios of 3 to 1, 1 to 1 and 1 to 3 parts of P to CMC. These five solutions were used in the evaluations and were pipetted volumetrically into each wash jar in the Launder- Ometer just prior to the addition of the detergent solution containing the soil (carbon black composition).

The agents used were P (identified above); and CMC—Type 70 high viscosity.

The tests were run in triplicate. Reflectance values were obtained on a Hunter reflectometer Model D-40 using the green filter, were average and plotted.

The test procedure followed was a modification of the Bailey and Weatherburn procedure.

The procedure is as follows:

MATERIALS USED

A. Carbon black (Aquadag-type)
B. An alkylarylsulfonate detergent composition which did NOT include soil anti-redeposition agent nor brightener. (Fab-type)
C. Fully bleached desized cotton fabric 2.5 oz. per yard, thread count 80 x 80.
D. Launder-Ometer
E. Hunter Reflectometer Model D-40
F. Ironer or hand iron
All runs were made in tap water at 135° F.

TEST PROCEDURE

The test fabric was cut into 4 x 4 inch squares, and the pieces were numbered.

Alkylarylsulfonate detergent solution containing no soil anti-redeposition agent (hereafter referred to as A.D.S.), was prepared by dissolving one gram of the formulated mix in hard or soft water to give 1 liter of solution.

Colloidal carbon black was prepared by dispersing 4.55 g. of carbon black composition of about 23% carbon (Aquadag-type composition) in 5,000 mls. of the detergent solution. 200 mls. of this solution are used in each wash bottle in the Launder-Ometer.

Soil anti-redeposition agent was prepared as follows: The soil anti-redeposition agents are dissolved in water to make a 0.1% solution. These are pipetted directly into the wash jars just prior to the addition of the detergent solution. Each 1 ml. addition of agent solution gives a 5 p.p.m. concentration of agent in a 200 ml. bath.

In the washing procedure employed, ten ¼ inch stainless steel balls were placed in each pint Launder-Ometer jar. The soil anti-redeposition agent was also placed in the jar. Two-hundred ml. of the detergent solution containing the carbon black was added, and the temperature was adjusted to 135° F. One piece of the prepared (and numbered) cotton cloth (wet with water) was added to each jar, and the jars were then sealed and tested for leakage by inverting.

After the jars were placed into Launder-Ometer and rotated for 20 minutes at 135° F., they were removed and each set of cloths was placed in a separate 400 ml. marked beaker. The beaker and contents were placed under running tap water at 100° F. to 120° F. for 30 seconds, the excess water was squeezed from cloth pieces, the cloths were ironed dry between clean pieces of cloth, and measured for reflectance of the washed cloths. The reflectance of each side of the cloths was measured and the two values obtained were averaged.

It has been found adequate to use the actual reflectance value of the washed cloths as a measure of the soil anti-redeposition properties.

The test results appear below and are tabulated as reflectance values.

TABLE I.—HUNTER REFLECTOMETER VALUES OF COTTON LAUNDERED USING VARIOUS SAR AGENTS AND BLENDS OF AGENTS AT VARIOUS CONCENTRATIONS

| Agent | Average Reflectance Values | | | | |
|---|---|---|---|---|---|
| | 0 p.p.m. | 5 p.p.m. | 10 p.p.m. | 25 p.p.m. | 50 p.p.m. |
| 3/1 CMC/P | 28 | 49.8 | 57.3 | 67.7 | 73.0 |
| 1/1 CMC/P | 28 | 53.1 | 61.0 | 70.4 | 73.4 |
| 1/3 CMC/P | 28 | 54.7 | 64.3 | 70.0 | 73.4 |
| P | 28 | 50.7 | 55.1 | 60.8 | 64.7 |
| CMC | 28 | 42.1 | 45.1 | 49.6 | 56.7 |

FIGURES 1, 2, and 3, below, illustrate several bases for establishing the presence of synergism.

The graph of FIGURE 1 is referred to in the calculations below:

A

A.D.S. reflectance=28 reflectance from the alkylarylsulfonate detergent solution containing "no" soil anti-redeposition agent.

B (a) 5 p.p.m. CMC=42.1=14.1 above 28
(b) 2×14.1=28.2 "summation" value expected
(c) 10 p.p.m. CMC=45.1=17.1 above 28

17.1 is $\frac{28.2-17.1}{28.2} \times 100\%$ less than the value expected to result by adding 5 p.p.m. to 5 p.p.m.→10 p.p.m.

17.1=40% less than "summation" value

C (d) 5 p.p.m. P=50.7=22.7 above 28
(e) 2×22.7=45.4 "summation" value expected
(f) 10 p.p.m. P=55.1=27.1 above 28
27.1 is $$\frac{45.4-27.1}{45.4} \times 100\%$$

less than the value expected to result by adding 5 p.p.m. to 5 p.p.m.→10 p.p.m.

27.1=64.5% less than "summation" value

D (a') 5 p.p.m. CMC+5 p.p.m. P=14.1+22.7=36.8 "summation" value
(b') Expected percent less than "summation" value should be
(50%+64.5%/2=52.25%
(c') Interpolated expected value=36.8−(36.8×52.25%) =17.6
(d') Interpolated expected reflectance=17.6+28=45.6
(e') Actual 10 p.p.m. of CMC/P at 1:1=61.0
(f') Synergism=61.0−45.6=15.4=81.8% above the 45.6 expected value $$\left(\text{i.e., } \frac{15.4}{17.6} \times 100\% = 81.1\%\right)$$

A second mathematical approach illustrating the presence of synergism above the reflectance to be expected from the combination of the separate concentrations of the respective agents is as follows. Still in reference to FIGURE 1:

A (1) 5 p.p.m.=42.1 reflectance (see a)
  =14.1 above 28.
(2) 10 p.p.m. CMC=45.1 reflectance (see c)
  =17.1 above 28.
(3) percentage increase of 10 p.p.m. above reflectance percentage of 5 p.p.m. equals $$\frac{17.1-14.1}{14.1} \times 100\% = 21.3\%$$

B (1) 5 p.p.m. P=50.7 reflectance (see d)
  =22.7 above 28.
(2) 10 p.p.m. P=55.1 reflectance (see f)
  =27.1 above 28.
(3) Percentage increase of 10 p.p.m. above reflectance percentage of 5 p.p.m. equals $$\frac{27.1-22.7}{22.7} \times 100\% = 19.4\%$$

C

Expected "summation" percentage increase for 10 p.p.m. 1 (of 5 p.p.m. CMC):1 (of 5 p.p.m. P) *equals* the average of 21.3% and 19.4%; i.e. *equals*

$$\frac{21.3\% + 19.4\%}{2} = 20.4\%$$

D (1) "Actual" reflectance of 1:1 of 5 p.p.m. CMC:5 p.p.m. P obtains 61.0 (see Table I or FIGURE 1 $e'$); i.e. a total concentration of 10 p.p.m. in combination=61.0 reflectance.

(2) "Actual" reflectance 1:1 of 2.5 p.p.m. CMC:25 p.p.m. P obtains 53.1 reflectance (see Table I).

Actual percentage increase above "actual" (D(2) above) equals $$\frac{61.0 - 53.1}{53.1 - 28} \times 100\% = \frac{7.9}{25.1} \times 100\% = 31\%$$

The 31% is actually a comparison in FIGURE 3, of the 10 p.p.m. curved line to the 5 p.p.m. curved line.

(3) *"Expected"* reflectance of 2.5 p.p.m. CMC:2.5 p.p.m. P to be obtained *equals*

$$\frac{14.1 \text{ (from A(1) above)} + 22.7 \text{ (from B(1) above)}}{2 \text{ (to obtain an average)}} =$$

$$\frac{36.8}{2} = 18.4 \text{ above 28}$$

Expected 10 p.p.m. reflectance of 1:1=18.4+28=46.4
Actual percentage increase above "expected" base equals $$\frac{61.0 - 46.4}{18.4} \times 100\% = \frac{14.6}{18.4} \times 100\% = 79\%$$

The graph of FIGURE 2 illustrates:

(1) The degrees of synergism in excess of anticipated interpolated "summation" value, for each concentration (p.p.m.) of the combination of agents; and (2) The comparative degree of synergism as affected by the ratio of the two agents in the combination;

(3) Optimum synergism:

5 p.p.m. at a ratio of 1:3 of CMC:P
10 p.p.m. at a ratio of 1:1 to 1:3 of CMC:P
25 p.p.m. at a ratio of 1:1 to 3:1 of CMC:P
50 p.p.m. at a ratio of 3:1 of CMC:P FIGURE 3 illustrates reflectance as a function of concentration, illustrating varying ratios of the agents in combination.

Although the illustrations of FIGURES 1, 2, and 3 have been described in reference to Example I, the invention should not be construed as limited thereby, nor as limited to the specific composition concentrations, etc.—utilized for purposes of illustration; i.e., the invention includes the use of the equivalents. It is to be understood that any suitable changes, modifications, and variations may be without departing from the scope of this invention, as defined in the appended claims.

I claim:

1. A composition consisting essentially of, (1) sodium carboxymethyl cellulose, and (2) a copolymer having a substantially linear hydrocarbon chain, containing relative molar ratios of hydroxyl substituents to carboxylic acid substituents ranging from about 30:70 to about 99:1, said carboxymethyl cellulose and said copolymer being present in a ratio of weights sufficient to produce synergistic soil anti-redeposition properties for said composition.

2. The composition according to claim 1, in which the ratio of said sodium carboxymethyl cellulose and said copolymer range from about 95:5 to about 10:90, based on weight by parts per 100.

3. The composition according to claim 1, in which the ratio of said sodium carboxymethyl cellulose and said copolymer range from about 85:15 to about 25:75, based on weight by parts per 100.

4. The composition according to claim 3, in which said copolymer is a hydrolyzed copolymer of vinyl acetate and ethyl acrylate.

5. A composition comprising in combination, (1) a detergent, and (2) a soil anti-redeposition composition consisting essentially of, (a) sodium carboxymethyl cellulose and (b) a copolymer having a substantially linear hydrocarbon chain, containing relative molar ratios of hydroxyl to carboxylic acid group ranging from about 30:70 to about 99:1, said carboxymethyl cellulose and said copolymer being present in a ratio of weights sufficient to produce synergistic soil anti-redeposition properties for said composition.

6. The composition according to claim 5, in which the ratio of said sodium carboxymethyl cellulose and said copolymer range from about 95:5 to about 10:90, based on weight by parts per 100.

7. The composition according to claim 6, in which the ratio of said sodium carboxymethyl cellulose and said copolymer range from about 85:15 to about 25:75, based on weight by parts per 100.

8. The composition according to claim 7, in which said copolymer is a hydrolyzed copolymer of vinyl acetate and ethyl acrylate.

9. A detergent composition comprising in combination (1) a detergent, and (2) a soil anti-redeposition composition consisting essentially of (a) sodium carboxymethyl cellulose, and (b) a copolymer having a substantially linear hydrocarbon chain containing relative molar ratios of hydroxyl to carboxylic acid groups ranging from about 30:70 to about 99:1, said carboxymethyl cellulose and said copolymer being present in a ratio of weights and said anti-redeposition being present in an amount sufficient to produce synergistic soil anti-redeposition properties for said detergent composition.

10. A detergent composition according to claim 5, in which said soil anti-redeposition agent is present in an amount ranging from about 0.05% to about 10% by weight based on total weight of said detergent composition.

11. A detergent composition according to claim 5, in which said soil anti-redeposition agent is present in an amount ranging from about 0.4% to about 5% by weight, based on total weight of said detergent composition.

12. A washing process employing the detergent composition in claim 11.

13. A detergent composition comprising in combination, (1) a detergent, and (2) a soil anti-redeposition composition consisting essentially of (a) sodium carboxymethyl cellulose and (b) a copolymer having a substantially linear hydrocarbon chain containing relative molar ratios of hydroxyl to carboxylic acid groups ranging from about 30:70 to about 99:1, said anti-redeposition agent being present in an amount ranging from about 0.4 to about 5% by weight based on total weight of said detergent composition, said carboxymethyl cellulose and said copolymer being present in an amount ranging from a ratio of about 85:15 to a ratio of about 25:75, based on weight by parts per 100, said anti-redeposition agent being present in an amount sufficient to produce synergistic soil anti-redeposition properties.

14. A detergent composition according to claim 13, in which said copolymer is a hydrolyzed copolymer of vinyl acetate and ethyl acrylate.

References Cited

UNITED STATES PATENTS

| | | | |
|---|---|---|---|
| 3,254,028 | 5/1966 | Wixon | 252—137 |
| 3,284,364 | 11/1966 | Siegele | 252—89 |

FOREIGN PATENTS 664,427   6/1963   Canada.

LEON D. ROSDOL, *Primary Examiner.*

W. E. SCHULZ, *Assistant Examiner.*